Patented Dec. 18, 1951

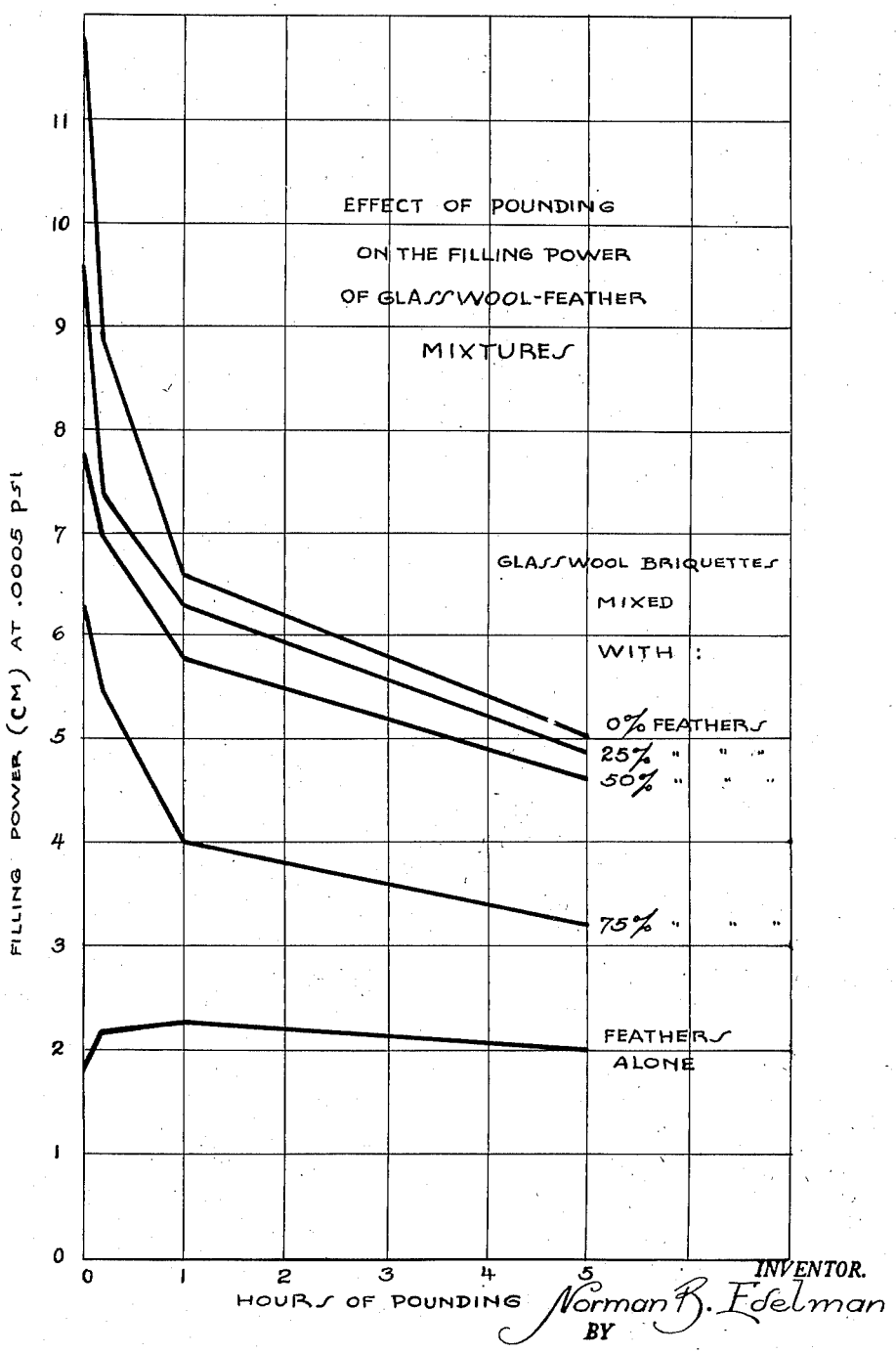

2,579,035

UNITED STATES PATENT OFFICE 2,579,035

INSULATION COMPOSITION OF RESIN-IMPREGNATED GLASS WOOL BRIQUETTES AND FEATHERS

Norman B. Edelman, Philadelphia, Pa.

Application October 11, 1948, Serial No. 53,947

10 Claims. (Cl. 252—62)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to an improved insulating material and, more particularly, concerns an improved bedding and sleeping bag filler material comprised of curled and/or uncurled feathers combined with a plurality of 3-dimensional prefabricated bodies, shaped from bodies having an elastic modulus of substantially $1 \times 10^{12}$ dynes per cm.$^2$ or more, bonded in open network form.

While it is to be understood that the combined materials as hereinafter described may be used for insulating purposes generally, either in bulk or packed forms of varying dimensions, it is particularly useful in sleeping bags, although likewise suitable as filler and padding in bedding, clothing, and possibly upholstery, or other items where softness and thermal insulation are required.

Previously a combination of waterfowl down and waterfowl feathers, in the proportions by weight of 40 to 60, respectively, was known to produce sleeping bags having the greatest utility with respect to warmth, softness and stability under conditions of repeated use. However, these materials are not plentiful, and it is, therefore, necessary to provide other materials which have equivalent or better properties than these or other materials heretofore used.

Generally, it may be stated that a combination of chicken feathers and/or turkey feathers with the above-mentioned 40/60 mixture was heretofore the best known substitute combination for filling sleeping bags. This combination, however, was found to be only a temporary substitute as the sleeping bags so filled could not withstand repeated launderings or usage without losing their softness and other desirable properties. Generally, experiments and experience show that feathers in combination with loose bulk fibers in the nature of wool, nylon, viscose rayon, inorganic and synthetic fibers and the like, become lumpy, felted, attenuated and disintegrated under conditions of repeated usage and, therefore, unsuitable for use as filling materials in sleeping bags, bedding or the like.

More specifically, it may be stated that the major specific requirements for bedding in the nature of sleeping bags or the like are thermal insulation, lightweight, highly compressive bulk volume, soft feel, and the ability to withstand repeated launderings without losing refluffability. By use of such substitute materials as heretofore known, either alone or in combination, one or more of these factors are sacrificed.

It is, therefore, an object of this invention to provide an improved insulating material of highly compressive bulk volume, soft feel, and relatively light weight.

It is another object of this invention to provide a combination of thermal insulating and packing materials capable of withstanding cleaning or launderings and being refluffed substantially to their original high bulk volume.

It is a further object of this invention to provide an insulating material comprised of a combination of feathers and pre-fabricated blocky or configurated fiber bodies, bonded in open network form, having highly compressive resistance and capable of being refluffed after laundering and use.

Another object of this invention is to provide a mixture or combination of feathers with pre-fabricated materials having a high degree of loftiness, and made of material characterized by a high Young's modulus of elasticity, and arranged to increase and impart fluffability and reduce bulk density.

Further objects and advantages of the invention will be apparent from the following description taken in conjunction with the accompanying drawing, which illustrates graphically the compressibility of pounded feathers and glass fiber bodies in comparison with mixtures thereof in different percentages.

As heretofore intimated, the prefered embodiment of this improvement in insulating is particularly utilized in sleeping bags. The outside cover cloth or closure means for such bags are of conventional character.

In general, the filling, packing or insulation herein described comprises mixtures which are a combination of pre-shaped flexible bodies formed, for example, from partially bonded glass wool fibers, or the like, having an elastic modulus on the order of $1 \times 10^{12}$ dynes per cm.$^2$ and carded, garnetted, or otherwise mixed with cleaned and/or curled feathers of either land fowl or waterfowl type.

The pre-shaped bodies of glass wool of the character herein described are cut or formed, for example, from prepared resin-impregnated sheets of glass wool batting of large cross-sectional area and varying from ½ inch to 1 inch in thickness. For general purposes, the quantity of resin impregnant may vary from very little to excessive amounts in proportion to values in durability and resiliency or softness desired.

It has been found that sheet batting of the character herein indicated, impregnated with from 10% to 30%, by weight, conventional urea-formaldehyde resin, set up by drying in a conventional manner, can be cut up into strips and the strips subdivided into cubical briquettes or rectangular shapes, which may be further subdivided to other irregular shapes, e. g., in the form of tetrahedrons, spheres, cylinders, parallelepipeds, polyhedrons, and many others of any regular or irregular shaped surfaces, which preferably do not extend in dimensions over 6 inches in any direction. That is, the largest dimensions indicated are preferably not exceeded when the pre-formed shapes, of uniform or mixed character, are combined with feathers and used in sleeping bags or pads, and the like.

The percentages of resin binder to fiber are above expressed in substantially the limits desired when the briquettes or other forms are to be utilized in the manner herein descibed, inasmuch as when the binder content is below 10% the fibers lack durability and over 30% become somewhat stiff and lose the softness desired as a bedding filler. As illustrated by the following table, the resin content necessary for the durability of a pre-fabricated body of the character herein described is preferably somewhat over 10% up to approximately 30%, or not over the value at which the filling is suitable for use in sleeping bags or bedding.

TABLE 1

*Effect of rotary impact*

| | | |
|---|---|---|
| Resin content (approx.) _____ per cent__ | 10 | 20 |
| Original thickness at .001 p. s. i.[1] pressure ____ cm__ | .90 | .90 |
| Thickness after test _____ cm__ | .40 | .75 |
| Per cent loss in thickness _____ | 55 | 17 |

[1] Pounds per square inch.

The large percent loss in thickness in the 10% sample is ilustrative of the inefficiency of the use of fibers with too little or no binding and the greater efficiency of the 20% sample is shown by a decreasing percentage loss, which is representative on a comparative basis of the value of such bodies, as herein illustrated, when considered in relation to the illustrative graph and the tables hereinafter set forth.

The feathers, as heretofore stated, may be of the character of duck and goose of the waterfowl type, or chicken and turkey of the land fowl type, which are preferably processed to be free of odor and appreciable foreign matter. The particular feathers utilized in the following illustrations were cleaned, uncurled chicken feathers and when mixed in equal proportions with substantially 20% resin impregnated glass fiber blocks of varying sizes, have a filling power on the order illustrated by the graph and in Table 2:

TABLE 2

*Filling power of various shapes of Fiberglas when mixed with 50% non-curled chicken feathers*

| Size of Fiberglas Blocks (inches) | Shape of Block | Filling Power (cm.) at Pressure of .0005 p. s. i. |
|---|---|---|
| (1) ½ x ½ x ½ | cube | 8.7 |
| (2) 1 x 1 x 1 | ____do____ | 7.5 |
| (3) 2 x 2 x 1 | rectangular | 7.7 |
| (4) ½ x 3 x 1 | ____do____ | 8.2 |
| (5) ½ x 3 x ½ | ____do____ | 9.1 |
| (6) edge of base ($\sqrt{2}$) cut from 1-inch cubes. | tetrahedron | 7.7 |

In making the filling power tests as herein illustrated, 20 grams of mixture were fluffed into a glass cylinder 11.5 inches inside diameter. A piston applying a pressure of .0005 p. s. i., slightly smaller in diameter than the cylinder was gently lowered on the mixture. The height of the piston from bottom of jar is called the filling power.

The tests under .02 and .22 p. s. i., in the following Table 3, were measured by the method described in the Textile Research Journal, volume XVII, No. 4, pages 199–206, of April 1947, except that 10 grams of filling material were tested.

Each Filling Power Result is the average of 3 tests.

From the above Table 2, it appears that items 1, 4 and 5 will give the highest filling powers in mixtures of pre-fabricated blocks and features prepared on a 50-50 by weight basis, although the relative values of other shapes are substantially equivalent to the duck-down and duck-feather mixtures heretofore used. The values of such mixtures may be recognized when considered comparatively from the following Table 3:

TABLE 3

*Filling power of various filling materials*

| | F. P. at p. s. i. Pressure of | | |
|---|---|---|---|
| | .0005 | .02 | .22 |
| | cm. | in. | in. |
| 1. Glasswool Briquettes (½" x 3" x 1") | 11.3 | 2.36 | 1.40 |
| 2. 50 percent (1)/50 percent (3) | 8.0 | 1.56 | .92 |
| 3. Prime West. Chicken Feathers | 2.2 | .55 | .44 |
| 4. 50 percent (1)/50 percent (5) | 9.0 | 1.66 | 1.01 |
| 5. Thermoset Curled Feathers from (3) | 7.3 | .92 | .70 |
| 6. Duck Feathers from L. I. White Ducks | 9.3 | 1.12 | .83 |
| 7. Duck Feathers from Prime West. Grey Ducks | 8.3 | 1.06 | .80 |
| 8. 40 percent Down/60 percent Feathers from (6) | 9.7 | 1.41 | 1.04 |

In comparison, the respective filling power of straight land fowl feathers alone is very poor, whereas the filling power of glasswool briquettes is very high, as shown by Table 3 and the illustrative graph, wherein 2 x 2 x 1-inch blocks were utilized. However, as heretofore stated, the materials are preferably not used alone in sleeping bags, as their properties are, in this state, inimical to such qualities as softness and durability, and although the addition of chicken feathers detracts from the filling power of glasswool briquettes, they do appear to reduce the degrading effect of compressive shearing stresses on the glasswool. In addition, the mixture provides in combination the necessary effect of softness and fluffability and may be mixed in proportions of feathers to glasswool briquettes according to the softness required or desired.

Further, there is illustrated by the graph a comparative value of filling power of original mixtures in varying proportions before and after usage. The ordinate line at zero is representative of measurements secured by the method hereinbefore indicated. The slopes of the various curves are samples of mixtures, in the proportions indicated, subjected to continuous rough usage represented by hours of pounding, one hour's pounding being the equivalent of a year or more of service.

The upward curve is representative of the performance of prefabricated glass wool briquettes of the character herein described without admixture of feathers. The next lower curve represents a mixture of prefabricated glass wool briquettes and feathers in the proportion of 75% to 25% respectively. The third curve is representative of a mixture of the character herein described in equal proportions and the fourth curve is representative of a mixture of prefabricated glass wool briquettes and feathers, the latter being present in a 75% proportion. The lowermost curve represents the performance of feathers without glass wool briquettes.

The graph illustrates that adding feathers to the briquettes tends to reduce the rate of loss in filling power, as seen by the reduction of the slopes of the curves, and further indicates that a compromise between durability and original filling power is preferred for obtaining the most efficient and economical mixture. This compromise, from the standpoint of standards set for sleeping bags using mixtures of duck down and duck feathers, is a 50-50 mixture by weight of feathers and pre-fabricated glasswool bodies, which equalizes loss in original filling power by gain in softness and retention of refluffability.

Further, it has been discovered that this admixture provides better thermal insulation per unit weight than standard mixtures heretofore used, particularly in mountain and arctic sleeping bags. This feature is suggested by Table 3, when considered in the light of known thermal insulation of glass fibers and fibrous materials as herein described.

In addition to the improvements provided by use of uncurled feathers, there is to be noted, by the Example 4 in Table 3, that curled feathers produce an increase in filling power which is substantially the equal of the standard duck-down/ duck-feather combination. These curled feathers are obtained as commercial items or by cleaning chicken feathers and curling them by the process disclosed in my co-pending application Serial No. 53,946 for Artificially Curled Feathers, filed October 11, 1948.

Glass fiber material for use in sleeping bags and the like has an elastic modulus substantially in excess of $1 \times 10^{12}$ dynes per cm.$^2$, or, at least, not less than $1 \times 10^{12}$ dynes per cm.$^2$, as such a modulus of elasticity is associated with the desirable mechanical properties of the bodies formed from such fibers, making them better suited for the purposes herein described. This fiber in the form of batting is impregnated with from 10% to 30% resin binder in the nature of phenolic type (e. g., phenol formaldehyde thermo-setting resin), silicon type, melamine, urea, acrylic, vinyl or other type of resin of the condensation or polymerization, e. g. vinyl-polymerization type, and the like, or other adhesive in the nature of rubber or elastomer types, glues, silicates, and the like, which are applied and allowed to set or become non-fluid by standard procedure as known with respect to each. This saturation is sufficient to bind the fibers together with a retention of their elasticity. It has further been discovered that the glass fibers can be self-bonded by the use of heat.

Thereafter, the pre-fabricated forms cut from this batting are 3-dimensional networks which have the resiliency and elasticity most desirable for sleeping bags and the like. The proportions between feathers and briquettes may be varied as desired and the degree of self-bonding and the relative percentage of adhesive or binder securing the fibers may also be varied dependent upon the desired flexibility of the mixture. Obviously, in the cleaning or laundering of items containing prefabricated bodies of the character herein described, solvents or temperatures should not be used which would be harmful and destroy the composite structures.

Other siliceous and resinous fibers having an elastic modulus on the order of $1 \times 10^{12}$ dynes per cm.$^2$ or greater, may be utilized mixed, or in admixture with glass fibers, for making resilient, briquette-like or other prefabricated bodies of the character indicated. These bodies are then mixed or combined with feathers for use as packing, insulating or stuffing materials. Such bodies may be formed and utilized in the manner described and illustrated in my co-pending application Serial No. 53,948, for Improved Insulation, Filling and Packing, filed October 11, 1948.

Obviously, by admixtures, in varying proportions of the materials, as shaped particles and feathers, of the character herein illustrated, many adaptations for insulation and fillings can be utilized. Such variations will generally be in proportion to the results desired from the standpoint of bulk, durability and softness, or other values afforded by the combination. When mixed in the manner illustrated, it is, of course, obvious that the filling power will vary somewhat, dependent upon the relative sizes and shapes of the briquettes, as indicated by Table 2, and, therefore, slightly different but relative values may be secured by different combinations.

The improved mixtures, in combinations as desired, may be packed between the coverings used for sleeping bags in any conventional manner, or otherwise they may be utilized for packing, filling and insulation where conventional materials are used for these purposes. The insulating and light-weight qualities of the combination herein described can also be utilized by inserting the mixture between fabric coverings, in a conventional manner, which are used for clothing purposes or the like. Further, for some combinations, a greater or lesser portion of binder, or bonding for holding the fibers in the forms desired is not harmful. Accordingly, admixtures of feathers and regular or irregular shaped bodies, impregnated or bonded to a greater or lesser extent, formed of materials of the character herein described may be manufactured for and/or utilized in many general applications that will come within the scope of the appended claims.

I claim:

1. Filling and insulating material comprising a uniform mixture of feathers and pre-fabricated glasswool bodies impregnated with approximately 10% to 30% resin by weight.

2. Filling and insulating material comprising uniform mixtures of land fowl feathers and bodies of glasswool impregnated with substantially from 10% to 30% resin by weight.

3. Filling and insulating material comprising uniform mixtures of waterfowl feathers and bodies of glasswool impregnated with substantially from 10% to 30% resin by weight.

4. Filling and insulating material comprising a uniform mixture of glasswool bodies impregnated with from about 10% to about 30% resin by weight, and curled chicken feathers.

5. Filling and insulating material comprising a uniform mixture of relatively fixed shapes of glasswool bodies impregnated with not substantially over 30% resin, and feathers.

6. Filling and insulating material comprising a uniform mixture of feathers and pre-fabricated 3-dimensional bodies formed of glass fibers, said last-named bodies being impregnated with from about 10% to about 30% resin by weight, said feathers and said bodies being mixed in the approximate ratio of 50 parts each.

7. Bedding containing filling and insulating material comprising feathers and a plurality of pre-fabricated 3-dimensional glass fiber bodies, said glass fiber bodies being impregnated with from about 10% to about 30% resin by weight, said combination being uniformly mixed in substantially the proportion of 50 parts feathers to 50 parts pre-fabricated bodies.

8. Bedding containing a filling material comprising a uniform mixture of a plurality of pre-fabricated 3-dimensional bodies formed of glass fibers impregnated with resin in an amount not substantially greater than 30%, and pre-curled feathers.

9. Filling and insulating material comprising a uniform mixture of a plurality of 3-dimensional glass fiber bodies impregnated with from about 10% to about 30% resin by weight, and feathers, in proportionate parts of from 75% to 25% glass fiber bodies and from 25% to 75% feathers.

10. Filling and insulating material comprising a uniform mixture of feathers and of a plurality of individual shape-sustainingly bonded 3-dimensional elastic glass fiber bodies in proportionate parts of from 25% to 75% feathers and from 75% to 25% glass fiber bodies, said glass fiber bodies having a filling power of about 11.3 cm. prior to being mixed with said feathers, said filling power being determined by loosely placing 20 grams of said glass fiber bodies into a cylinder of 11.5 in. inside diameter, compressing said glass fiber bodies at .0005 pound per sq. in., and measuring the height of the compressed column of said mixture in said cylinder.

NORMAN B. EDELMAN.

REFERENCES CITED

The following references are of record in the file of this patent:

UNITED STATES PATENTS

| Number | Name | Date |
| --- | --- | --- |
| 226,261 | Amick | Apr. 6, 1880 |
| 1,528,585 | Szecsy | Mar. 3, 1925 |
| 2,252,157 | Bergin et al. | Aug. 12, 1941 |
| 2,419,732 | Rubinstein | Apr. 29, 1947 |